(12) United States Patent
Hamaguchi et al.

(10) Patent No.: US 12,146,961 B2
(45) Date of Patent: Nov. 19, 2024

(54) VEHICLE BEHAVIOR DETECTION DEVICE AND DETECTION SYSTEM

(71) Applicant: IHI Corporation, Tokyo (JP)

(72) Inventors: Kenichi Hamaguchi, Tokyo (JP); Yosuke Seto, Tokyo (JP); Yoshihisa Yamanouchi, Tokyo (JP)

(73) Assignee: IHI Corporation, Tokyo (JP)

( * ) Notice: Subject to any disclaimer, the term of this patent is extended or adjusted under 35 U.S.C. 154(b) by 1037 days.

(21) Appl. No.: 17/056,448

(22) PCT Filed: Mar. 13, 2019

(86) PCT No.: PCT/JP2019/010325
§ 371 (c)(1),
(2) Date: Nov. 18, 2020

(87) PCT Pub. No.: WO2019/230123
PCT Pub. Date: Dec. 5, 2019

(65) Prior Publication Data
US 2021/0208282 A1 Jul. 8, 2021

(30) Foreign Application Priority Data
May 30, 2018 (JP) .................... 2018-103930

(51) Int. Cl.
*G01S 17/89* (2020.01)
*G01S 17/42* (2006.01)
(Continued)

(52) U.S. Cl.
CPC .............. *G01S 17/89* (2013.01); *G01S 17/42* (2013.01); *G08G 1/0116* (2013.01); *G08G 1/017* (2013.01); *G08G 1/04* (2013.01); *G08G 1/056* (2013.01)

(58) Field of Classification Search
CPC ................................ G01S 17/931; G08G 1/04
See application file for complete search history.

(56) References Cited

U.S. PATENT DOCUMENTS

| 5,432,547 A | 6/1995 | Toyama | |
|---|---|---|---|
| 2002/0005898 A1* | 1/2002 | Kawada | G08G 1/04 348/149 |

(Continued)

FOREIGN PATENT DOCUMENTS

| JP | 05-143892 A | 6/1993 |
|---|---|---|
| JP | 06-052485 A | 2/1994 |

(Continued)

OTHER PUBLICATIONS

Machine Translation of JP-06325287-A (Year: 1994).*

(Continued)

*Primary Examiner* — Yuqing Xiao
*Assistant Examiner* — Zhengqing Qi
(74) *Attorney, Agent, or Firm* — Volpe Koenig

(57) ABSTRACT

A detection device, which detects a target behavior that is a vehicle behavior subjected to detection in a preset detection area using a laser radar that generates point cloud information by irradiating the detection area with laser light and receiving reflected light resulting from the irradiation with the laser light, includes an acquisition unit configured to acquire the point cloud information, a vehicle detection unit configured to detect a vehicle on the basis of the point cloud information, and a behavior detection unit configured to detect the target behavior on the basis of a direction of movement and an amount of movement per unit time of the vehicle detected by the vehicle detection unit.

8 Claims, 13 Drawing Sheets

(51) Int. Cl.
  *G08G 1/01*    (2006.01)
  *G08G 1/017*   (2006.01)
  *G08G 1/04*    (2006.01)
  *G08G 1/056*   (2006.01)

(56) References Cited

U.S. PATENT DOCUMENTS

| | | |
|---|---|---|
| 2011/0026008 A1 | 2/2011 | Gammenthaler |
| 2016/0019797 A1 | 1/2016 | Klang et al. |
| 2016/0035220 A1* | 2/2016 | Paromtchik ........... B60W 50/14 701/117 |
| 2016/0110616 A1 | 4/2016 | Kawasaki et al. |
| 2017/0025003 A1* | 1/2017 | Arpin ...................... G01V 8/12 |

FOREIGN PATENT DOCUMENTS

| | | | | |
|---|---|---|---|---|
| JP | 06-096385 A | | 4/1994 | |
| JP | 06-187591 A | | 7/1994 | |
| JP | 06325287 A | * | 11/1994 | |
| JP | 10-269492 A | | 10/1998 | |
| JP | 2000-057499 A | | 2/2000 | |
| JP | 2003-141679 A | | 5/2003 | |
| JP | 2003-331388 A | | 11/2003 | |
| JP | 2004185363 A | * | 7/2004 | ............ G01B 11/00 |
| JP | 2005-107934 A | | 4/2005 | |
| JP | 2006190066 A | * | 7/2006 | |
| JP | 2009-258989 A | | 11/2009 | |
| JP | 2013-045249 A | | 3/2013 | |
| JP | 2016-045915 A | | 4/2016 | |
| JP | 6007395 B2 | | 10/2016 | |
| JP | 6165120 B2 | | 7/2017 | |
| JP | 6280659 B2 | | 2/2018 | |
| WO | 2013/128427 A1 | | 9/2013 | |

OTHER PUBLICATIONS

Machine Translation of JP-2004185363-A (Year: 2004).*
Machine Translation of JP-2006190066-A (Year: 2006).*
Serway et al., "Physics for Scientists and Engineers with Modern Physics, 5th Edition," p. 77 & 186 (Year: 2000).*

* cited by examiner

VEHICLE BEHAVIOR DETECTION DEVICE AND DETECTION SYSTEM

TECHNICAL FIELD

The present disclosure relates to a detection device and a detection system.

BACKGROUND ART

A technique for detecting the behavior of the vehicle has been known. For example, Patent Literature 1 describes a vehicle monitoring device that extracts a candidate vehicle from an input image captured by an imaging device provided at a position overlooking the road and determines whether the vehicle is a normal vehicle or a wrong-way traveling vehicle according to the displacement of feature points of the candidate vehicle.

CITATION LIST

Patent Literature

Patent Literature 1: Japanese Unexamined Patent Publication No. H10-269492

SUMMARY OF INVENTION

Technical Problem

The vehicle monitoring device described in Patent Literature 1 calculates position information of the vehicle from the image by image processing in order to detect the behavior of the vehicle. Images captured by a camera or the like are susceptible to disturbances in the imaging environment. Therefore, the position information acquired on the basis of the image may not have sufficient accuracy. Further, the vehicle monitoring device described in Patent Literature 1 determines the direction of travel from the displacement of the feature points and determines whether the vehicle is a normal vehicle or a wrong-way traveling vehicle but if, for example, the displacement is small, false detection may occur. In this technical field, it is desired to improve the accuracy of detection of a vehicle behavior.

The present disclosure describes a detection device capable of improving the accuracy of detection of the vehicle behavior.

Solution to Problem

A detection device according to an aspect of the present disclosure is a device for detecting a target behavior that is a vehicle behavior subjected to detection in a preset detection area by using a laser radar that irradiates the detection area with laser light and receives reflected light of the laser light to generate point cloud information. The detection device includes an acquisition unit configured to acquire the point cloud information, a vehicle detection unit configured to detect a vehicle on the basis of the point cloud information, and a behavior detection unit configured to detect the target behavior on the basis of a direction of movement and an amount of movement per unit time of the vehicle detected by the vehicle detection unit.

Effects of Invention

According to the present disclosure, it is possible to improve the accuracy of detection of the vehicle behavior.

DESCRIPTION OF EMBODIMENTS

[1] Outline of the Embodiment

Figure 1:
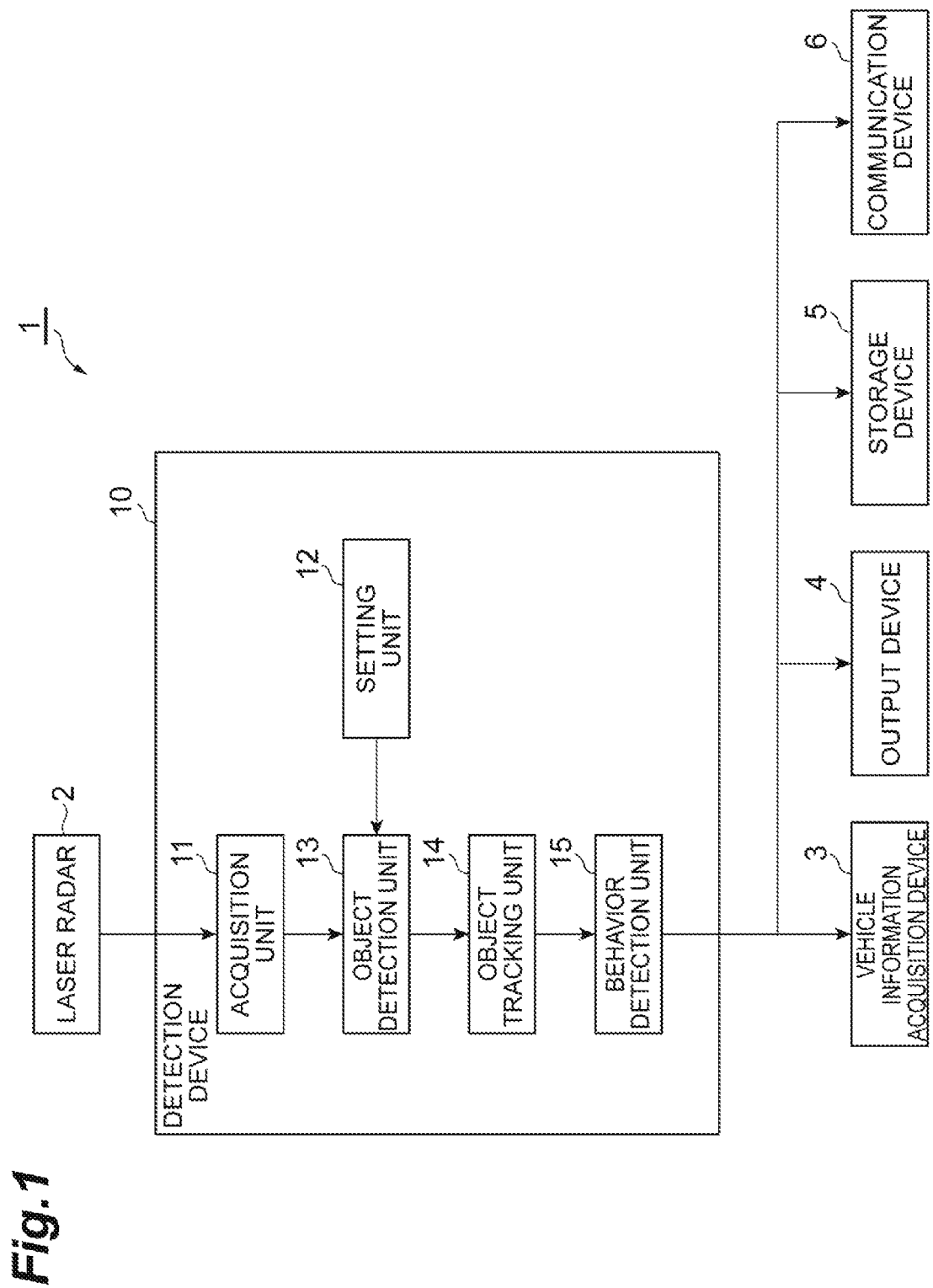
FIG. 1 is a diagram schematically illustrating a configuration of a detection system including a detection device according to an embodiment.

A detection device according to an aspect of the present disclosure is a device for detecting a target behavior that is a vehicle behavior subjected to detection in a preset detection area by using a laser radar that irradiates the detection area with laser light and receives reflected light of the laser light to generate point cloud information. The detection device includes an acquisition unit configured to acquire the point cloud information, a vehicle detection unit configured to detect a vehicle on the basis of the point cloud information, and a behavior detection unit configured to detect the target behavior on the basis of a direction of movement and an amount of movement per unit time of the vehicle detected by the vehicle detection unit.

The detection device detects the vehicle using the point cloud information generated by the laser radar. The point cloud information generated on the basis of the reflected light of the laser light is less susceptible to light intensity, weather conditions, and the like, so that the vehicle can be detected with high accuracy according to the point cloud information. Further, the detection device detects the target behavior on the basis of the direction of movement and the amount of movement per unit time of the detected vehicle. Thus, it is possible to reduce the possibility of false detection of the target behavior due to the measurement error since the amount of movement per unit time of the vehicle as well as the direction of movement of the vehicle are considered. As a result, it is possible to improve the accuracy of detection of the vehicle behavior.

The vehicle detection unit may calculate position information indicating the position of the vehicle on the basis of the point cloud information. The behavior detection unit may calculate a vector indicating the direction of movement on the basis of first position information which is the position information at time 1, and second position information which is the position information at time 2 before time 1. The behavior detection unit may determine whether the vehicle has performed the target behavior on the basis of the vector. From time 2 to time 1, the vehicle has moved from the second position indicated by the second position information to the first position indicated by the first position information. Therefore, the vector indicating the direction of movement of the vehicle can be calculated using the position information at the two times.

The behavior detection unit may calculate a position vector indicating the distance and direction from the second position indicated by the second position information to the first position indicated by the first position information, and calculate a velocity vector as the vector by dividing the position vector by a time difference between time 1 and time 2. In this case, the velocity vector indicates the direction of movement and the amount of movement per unit time of the vehicle. Therefore, it is possible to reduce the false detection of the target behavior due to measurement errors because whether the vehicle has performed the target behavior is determined using the velocity vector.

The behavior detection unit may calculate an inner product of a reference vector, which has an orientation along the direction of traffic of the vehicle permitted in the detection area, and the velocity vector, and may determine whether the vehicle has performed the target behavior by comparing the inner product with a predetermined threshold value. The inner product obtained as described above represents the direction of movement and the amount of movement per unit time of the vehicle. Therefore, the use of the inner product allows reduction of the amount of calculation required to detect the target behavior.

The behavior detection unit may determine whether the vehicle has performed the target behavior on the basis of the transition of the vector. When the vehicle performs the target behavior, the direction of movement of the vehicle changes over time in a predetermined pattern corresponding to the target behavior. Therefore, it can be determined that the vehicle has performed the target behavior when the vector changes in the predetermined pattern.

When the target behavior is a behavior that constitutes a traffic violation, the behavior detection unit may output an acquisition command that causes an external device to acquire vehicle information to identify the vehicle that has performed the target behavior. In this case, the vehicle information for identifying the traffic violation vehicle is acquired. Accordingly, it is possible, for example, to impose penalty points on and collect fines from the driver of a traffic violation vehicle.

A detection system according to another aspect of the present disclosure includes the detection device described above and a laser radar. Since this detection system includes the above-described detection device, it is possible to improve the accuracy of detection of the vehicle behavior.

[2] Exemplification Embodiment

Hereinafter, an embodiment of the present disclosure is described with reference to the accompanying drawings. In the description of the drawings, the same elements are denoted by the same reference signs and duplicate explanations are omitted.

Figure 2:
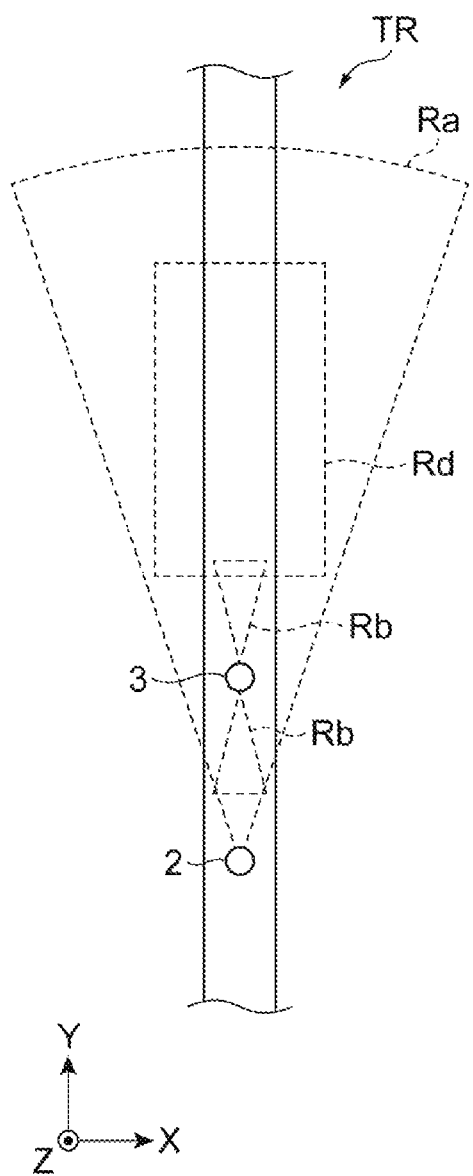
FIG. 2 is a diagram illustrating an arrangement example of a laser radar and a vehicle information acquisition device illustrated in FIG. 1.
Figure 3:
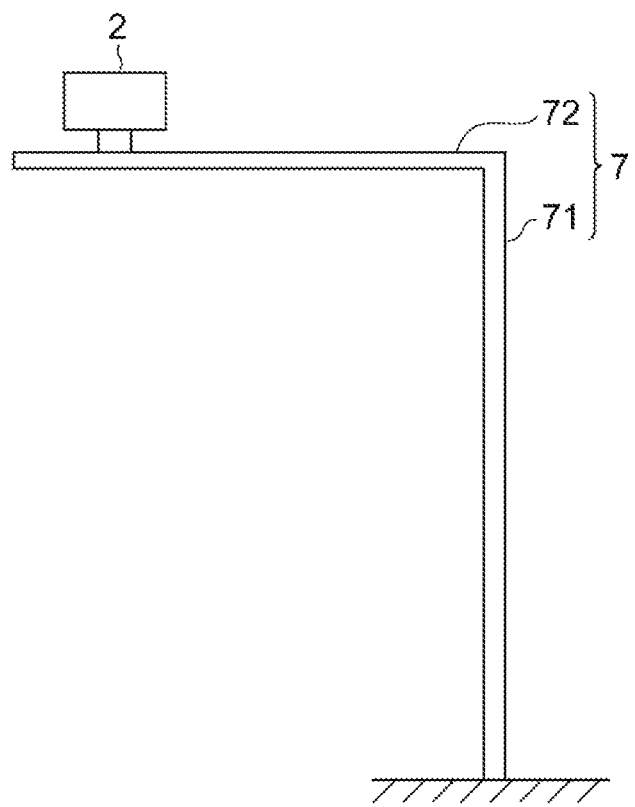
FIG. 3 is a diagram illustrating an installation example of the laser radar.
Figure 4:
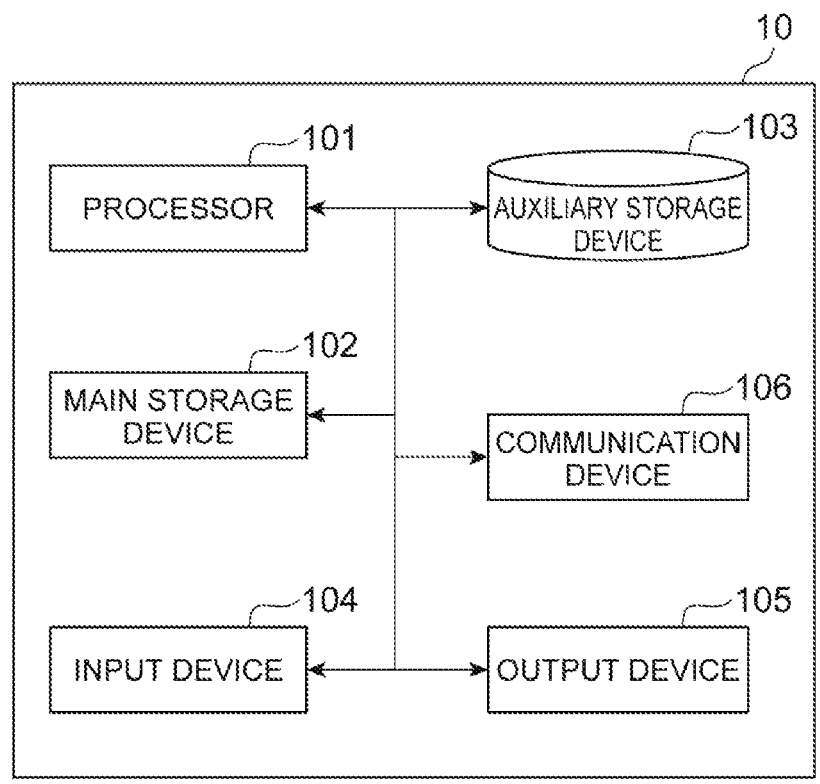
FIG. 4 is a diagram illustrating a hardware configuration of the detection device illustrated in FIG. 1.
Figure 5:
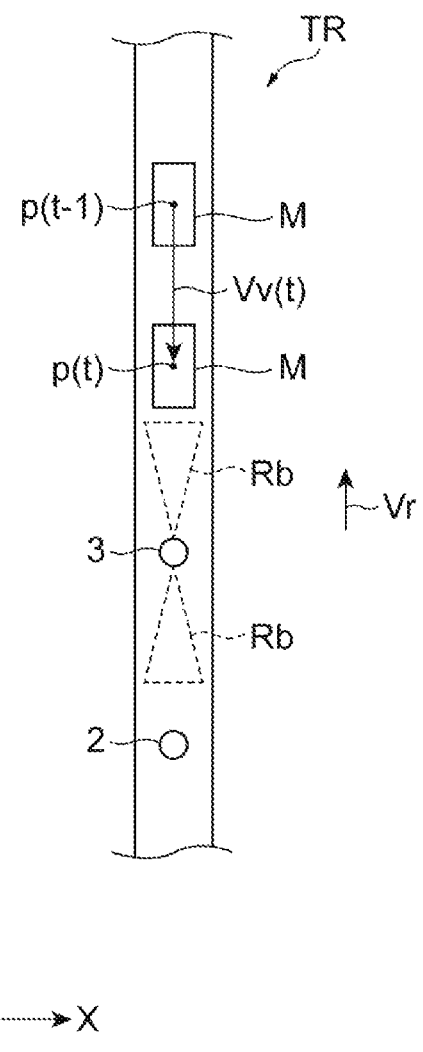
FIG. 5 is a diagram for explaining detection of wrong-way traveling.

FIG. 1 is a diagram schematically illustrating a configuration of a detection system including a detection device according to an embodiment. FIG. 2 is a diagram illustrating an arrangement example of a laser radar and a vehicle information acquisition device illustrated in FIG. 1. FIG. 3 is a diagram illustrating an installation example of the laser radar. FIG. 4 is a diagram illustrating a hardware configuration of the detection device illustrated in FIG. 1. FIG. 5 is a diagram for explaining detection of wrong-way traveling.

The detection system 1 illustrated in FIG. 1 is a system that detects the behavior of a vehicle at a target point. More specifically, the detection system 1 detects the target behavior of the vehicle at the target point. The target point is a location (point) on the road to be monitored. An arbitrary location on the road can be selected as the target point. For example, an intersection, a confluence point, or a point in the middle of the road is selected as the target point. Examples of vehicles include automobiles and motorcycles.

The target behavior is the vehicle behavior subjected to detection. The target behavior includes (traffic) violation traveling. Examples of the violation traveling include, for example, U-turns in areas where U-turns are prohibited, right (or left) turns in areas where right turns (or left turns) are prohibited at intersections, traveling in the opposite direction from the permitted direction of traffic of the vehicle on the road (hereinafter, "wrong-way traveling"), and lane changes in areas where lane changes are prohibited. The present embodiment is explained with the wrong-way traveling as the target behavior. The detection system 1 is used for an intelligent transport systems (ITS). The detection system 1 includes a laser radar 2, a vehicle information acquisition device 3 (external device), an output device 4, a storage device 5, a communication device 6, and a detection device 10.

The laser radar 2 is a device that generates point cloud information. The laser radar 2 is also referred to as a light detection and ranging (LiDAR) or a laser range finder. As illustrated in FIGS. 2 and 3, the laser radar 2 is installed near the target point. In the example illustrated in FIG. 2, the target point is a point in the middle of a road TR. The laser radar 2 is provided, for example, above the target point. The laser radar 2 is fixed to a support member 7 installed on the ground. For example, the support member 7 is provided on the roadside of the road TR. The support member 7 includes, for example, a post 71 standing on the roadside, and an arm 72 that extends from the upper end of the post 71 in a direction crossing the road. The laser radar 2 is installed on the arm 72. The support member 7 may be, for example, a utility pole and a warehouse wall. The illustration of the support member 7 is omitted in, for example, FIG. 2.

The laser radar 2 emits laser light toward an irradiation possible range Ra and receives the reflected light of the emitted laser light to generate point cloud information. The irradiation possible range Ra is a range in which the laser radar 2 can irradiate the laser light and is, for example, about 150 meters. The irradiation possible range Ra includes a detection area Rd. The detection area Rd is an area to be monitored in the irradiation possible range Ra. The point cloud information is a set of measurement point information of each measurement point included in the irradiation possible range Ra.

The measurement point information includes time information and position information. The time information is information indicating time when the measurement point information is generated (the reflected light is received) for the measurement point indicated by the position information. The position information is information indicating the position of the measurement point. For the position, a polar coordinate system expressed in terms of yaw angle, pitch angle, and depth may be used, and a three-dimensional coordinate system of X coordinates, Y coordinates, and Z coordinates may be used. As the coordinates of each measurement point, for example, the coordinates in which the position of the laser radar 2 is the origin are used. In the example illustrated in FIG. 2, the width direction of the road TR is the X-axis direction, the direction in which the road TR extends is the Y-axis direction, and the height direction is the Z-axis direction. The measurement point information may further include reflection intensity information. The reflection intensity information is information indicating the intensity of the reflected light received from the measurement point indicated by the position information at the time indicated by the time information.

The laser radar 2 scans the irradiation possible range Ra with the laser light in the main scanning direction and the sub scanning direction. The point cloud information acquired by irradiating the irradiation possible range Ra with the laser light may be referred to as one frame. The irradiation of the irradiation possible range Ra with the laser light is repeated at predetermined time intervals. The laser radar 2 transmits the generated point cloud information to the detection device 10.

The vehicle information acquisition device 3 is a device that acquires vehicle information for identifying the vehicle determined by the detection device 10 as having performed the target behavior. The vehicle information acquisition device 3 is, for example, an automatic speed violation enforcement device. As the vehicle information, an image of a license plate, for example, is used. When the vehicle information acquisition device 3 receives an acquisition command along with vehicle position information from the detection device 10, the vehicle information acquisition device 3 acquires an image of the license plate by, for example, capturing an image so as to include the license plate of the vehicle (the vehicle to be acquired) that exists at the position indicated by the vehicle position information.

When the vehicle to be acquired enters monitoring range Rb, the vehicle information acquisition device 3 captures an image of the vehicle. The monitoring range Rb is a range in which the vehicle information acquisition device 3 can capture images and the range is in about several meters. In the example illustrated in FIG. 2, the monitoring ranges Rb are set with respect to the vehicle information acquisition device 3 in both directions along the extending direction of the road TR. Since the license plates are provided on the front side and the rear side of the vehicle, the vehicle information acquisition device 3 may photograph the vehicle from either the front side or the rear side of the vehicle.

The vehicle information acquisition device 3 is fixed to the support member similarly to the laser radar 2. The laser radar 2 and the vehicle information acquisition device 3 may be installed on the same support member or different support members. The illustration of the support member is omitted in, for example, FIG. 2. The vehicle information acquisition device 3 may transmit the vehicle information to the storage device 5 and store the vehicle information in the storage device 5. The vehicle information acquisition device 3 may transmit the vehicle information to a public organization, a road management company, or the like via the communication device 6.

The output device 4 is a device that gives cautions, warnings, and instructions. The output device 4 includes, for example, a display board and a loud speaker. When receiving the output command from the detection device 10, the output device 4 outputs the caution, warning, instruction, and the like to the driver of the violating vehicle. The output device 4 may output the caution, warning, instruction, and the like to pedestrians and the like in the surroundings.

The storage device 5 is a device that stores various kinds of information. Examples of the storage device 5 include a hard disk device and a semiconductor memory. Various kinds of information stored in the storage device 5 include, for example, the vehicle information acquired by the vehicle information acquisition device 3, and detection time, position, speed, and size (dimensions) of the detected vehicle as described below. When the vehicle information acquisition device 3 includes a video camera, the various kinds of information may include a video image of a time period including the detection time. The various kinds of information may include point cloud information of a time period including the detection time. The various kinds of information may include a trajectory of movement of the detected vehicle (vehicle position information in time series).

The communication device 6 is a communication facility installed at the side of the road. The communication device 6 is, for example, a roadside device (ITS spot). The communication device 6 communicates with an external device outside the detection system 1. Examples of the external device include an on-vehicle device, a server device, and other systems and the like. The communication device 6 transmits information similar to the various kinds of information stored in the storage device 5 to the external device.

The detection device 10 is a device that detects the behavior of the vehicle in the detection area Rd using the laser radar 2. The detection device 10 is constituted of, for example, an information processing device such as a computer.

As illustrated in FIG. 4, the detection device 10 may physically be configured as a computer including hardware constituted of one or more processors 101, a main storage device 102 such as a random access memory (RAM) and a read only memory (ROM), an auxiliary storage device 103 such as a hard disk device, an input device 104 such as a keyboard, an output device 105 such as a display, a communication device 106 which is a data transmission and reception device, such as a network interface card (NIC), and a wireless communication module, and the like. Each of the functions illustrated in FIG. 1 of the detection device 10 is implemented by loading one or more predetermined computer programs into the hardware, such as the main storage device 102, to operate each hardware under the control of the one or more processors 101, as well as to read and write data in the main storage device 102 and the auxiliary storage device 103.

The detection device 10 functionally includes an acquisition unit 11, a setting unit 12, an object detection unit 13 (vehicle detection unit), an object tracking unit 14, and a behavior detection unit 15.

The acquisition unit 11 acquires the point cloud information from the laser radar 2. The acquisition unit 11 outputs the acquired point cloud information to the object detection unit 13.

The setting unit 12 acquires area information indicating the detection area Rd. For example, the user sets the detection area Rd using the input device 104 of the detection device 10. For example, a three-dimensional space simulating the target point is displayed on the output device 105, and the user sets the detection area Rd using a frame or the like. For example, the detection area Rd is set so as not to include the sidewalk. Intersections and streets are equipped with fixed objects such as traffic lights, posts, utility poles, and overhead structures. Since these fixed objects are not to be monitored, a range below a predetermined height may be set as the height of the detection area Rd to exclude these fixed objects. In addition, the range above the predetermined height may be set as the height of the detection area Rd to exclude the ground. For example, a range from 20 cm to 500 cm may be set for the height of the detection area Rd with respect to the ground surface. The setting unit 12 acquires area information indicating the set detection area Rd and outputs the acquired area information to the object detection unit 13.

The object detection unit 13 detects a vehicle on the basis of the point cloud information. Specifically, when the object detection unit 13 receives the point cloud information from the acquisition unit 11, the object detection unit 13 excludes, from the point cloud information, the measurement point information of the measurement points located outside the detection area Rd indicated by the area information received from the setting unit 12. The object detection unit 13 clusters the remaining point cloud information. In other words, the object detection unit 13 connects neighboring measurement points among a plurality of measurement points in the detection area Rd and divides them into clusters (lumps). The object detection unit 13 detects each of the acquired clusters as a single detected object (vehicle, person, or the like).

The object detection unit 13 calculates dimensions (width, depth, and height) and position of the detected object. The position of the detected object may be provided as the coordinates of the four corners (front right end, front left end, rear right end, and rear left end) of the detected object, the average of the positions of the measurement point information included in the cluster, or the position of the center of gravity of the detected object. The position of the detection object may also be provided as the coordinates of the front right end and the front left end, or the coordinates of the measurement point closest to the laser radar 2.

Since the detection device 10 detects the behavior of the vehicle, it is not necessary to track moving objects (non-vehicles) such as persons and birds. Therefore, the object detection unit 13 excludes the non-vehicles from the detected objects. Specifically, the object detection unit 13 classifies the detected objects on the basis of the size (dimensions) of the detected objects. Here, the object detection unit 13 classifies the detected objects into vehicles and non-vehicles. For example, the object detection unit 13 classifies the detected object as a non-vehicle when the width of the detected object is less than 1 meter, and classifies the detected object as a vehicle when the width of the detected object is at least 1 meter.

The object detection unit 13 outputs the detection result of the detected object classified as a vehicle (hereinafter referred to as the "detected vehicle") to the object tracking unit 14. The detection result includes dimensional information indicating the dimensions of the detected vehicle, vehicle position information indicating the position of the detected vehicle, and detection time information indicating the detection time when the detected vehicle is detected. The detection time is, for example, the average time of the times indicated by the time information in the measurement point information of the measurement points included in the cluster.

The object tracking unit 14 tracks the detected vehicle and generates a tracking result. In other words, when the object tracking unit 14 receives the detection result from the object detection unit 13, the object tracking unit 14 maps a vehicle identifier (ID) to the detected vehicle detected in different frames (different detection times). The vehicle ID is identification information that can uniquely identify the detected vehicle. Specifically, the object tracking unit 14 determines whether the detected vehicle detected in the current frame corresponds to any one of the detected vehicles in the past frames, on the basis of the position and dimensions of the detected vehicle and the speed, angular velocity, and the like estimated from past observations.

When the object tracking unit 14 determines that the detected vehicle detected in the current frame does not correspond to any one of the detected vehicles detected in the past frames, the object tracking unit 14 assigns the detected vehicle with a new vehicle ID as a new detected vehicle. When the object tracking unit 14 determines that the detected vehicle detected in the current frame corresponds to the detected vehicle detected in the past frame, the object tracking unit 14 assigns the detected vehicle detected in the current frame with the vehicle ID assigned to the corresponding detected vehicle. The object tracking unit 14 deletes the vehicle ID of the detected vehicle that has not been detected for a long time among the detected vehicles to which the vehicle ID has been assigned.

The problem of tracking (assigning ID to) a plurality of detected vehicles is called a multi-target tracking problem. The object tracking unit 14 tracks each detected vehicle using a known algorithm. Known algorithms include the suboptimal nearest neighbor (SNN), the global nearest neighbor (GNN), the joint probabilistic data association filter (JPDAF), and the like. The object tracking unit 14 outputs the tracking result to the behavior detection unit 15. The tracking result includes the vehicle ID, the vehicle position information, and the detection time information.

The behavior detection unit 15 detects the target behavior of the detected vehicle on the basis of the vehicle ID and the vehicle position information. Specifically, the behavior detection unit 15 detects the target behavior on the basis of the direction of movement (direction of traveling) and the amount of movement (amount of traveling) per unit time of the detected vehicle. More specifically, when the behavior detection unit 15 receives the tracking result from the object tracking unit 14, the behavior detection unit 15 calculates the velocity vector. The velocity vector has an orientation along the direction of movement of the detected vehicle and a magnitude corresponding to the amount of movement per unit time of the detected vehicle. In other words, the velocity vector indicates the direction of movement and the amount of movement per unit time of the detected vehicle.

As illustrated in FIG. 5, the behavior detection unit 15 calculates the velocity vector on the basis of, for example, the vehicle position information (second position information) in the previous frame (at detection time t−1) and the vehicle position information (first position information) in the current frame (at detection time t). In other words, the behavior detection unit 15 calculates a position vector indicating the distance and direction from position p(t−1) of the detected vehicle M indicated by the vehicle position information in the previous frame to position p(t) of the detected vehicle M indicated by the vehicle position information in the current frame. The position vector indicates the direction of movement and the amount of movement of the detected vehicle M. The position vector is also called a motion vector. As shown in Formula (1), the behavior detection unit 15 subtracts the position p(t−1) (second position) from the position p(t) (first position) to obtain the position vector, and divides the position vector by a time difference between the detection time t (time 1) and the detection time t−1(time 2) to calculate the velocity vector Vv(t)=(vx, vy) at the detection time t.

[Formula 1]

$$Vv(t) = \frac{p(t) - p(t-1)}{t - (t-1)} = (vx, vy) \quad (1)$$

The behavior detection unit 15 determines whether the detected vehicle M has traveled the wrong way on the basis of the velocity vector. For example, as shown in Formula (2), the behavior detection unit 15 calculates the inner product of the reference vector Vr and the velocity vector Vv(t). The reference vector Vr is a unit vector having the orientation along the permitted direction of traffic of the vehicle on the road (lane) on which the detected vehicle M is traveling. The unit vector is a vector whose magnitude is 1. The reference vector Vr=(sx, sy) is preset in the behavior detection unit 15. Assuming that the permitted direction of traffic of the vehicle on the road TR illustrated in FIG. 5 is the Y-axis positive direction, the reference vector Vr is set to (0, 1).

[Formula 2]

$$Vr \cdot Vv(t) = (sx, sy) \cdot (vx, vy) = sx \times vx + sy \times vy \quad (2)$$

When the direction of movement of the detected vehicle M is the same as the direction of traffic, the inner product has a positive value. When the direction of movement of the detected vehicle M is opposite to the direction of traffic, the inner product has a negative value. When the detected vehicle M is stopped, the inner product is 0. The greater the inner product, the greater the amount of movement of the detected vehicle M per unit time. In other words, the inner product is used as an index indicating the direction of movement and the amount of movement per unit time of the detected vehicle M.

The behavior detection unit 15 determines whether the detected vehicle M has performed the target behavior by comparing the inner product with a threshold value. When the target behavior is the wrong-way traveling, the threshold value is a predetermined negative value having a magnitude (absolute value) large enough to exclude the measurement error by the laser radar 2. The behavior detection unit 15 determines that the detected vehicle M is traveling the wrong way if, for example, the inner product continues to take a negative value smaller than the threshold value at least for a predetermined period of time (fixed time).

Figure 6:
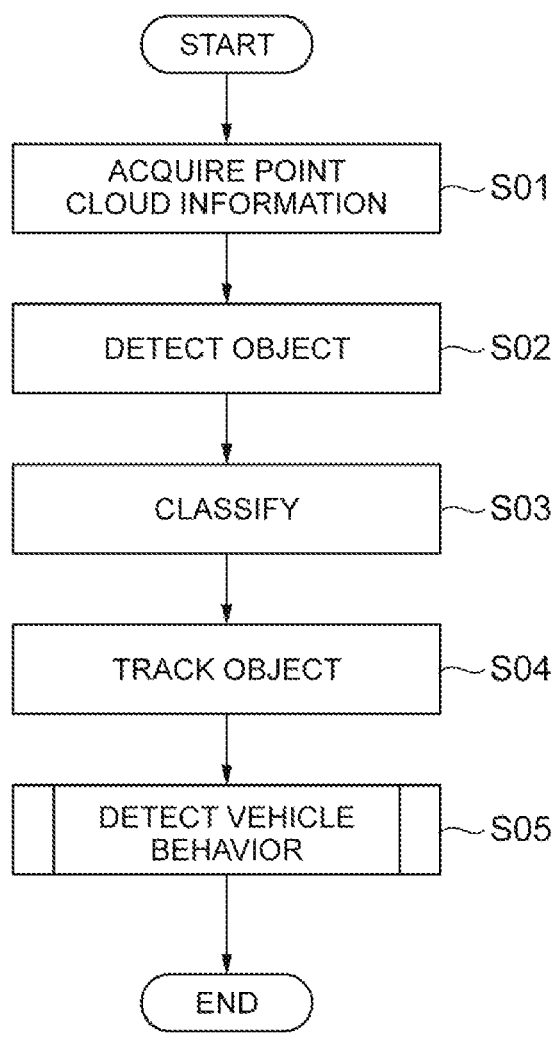
FIG. 6 is a flowchart illustrating a series of processing steps of a detection method carried out by the detection device.
Figure 7:
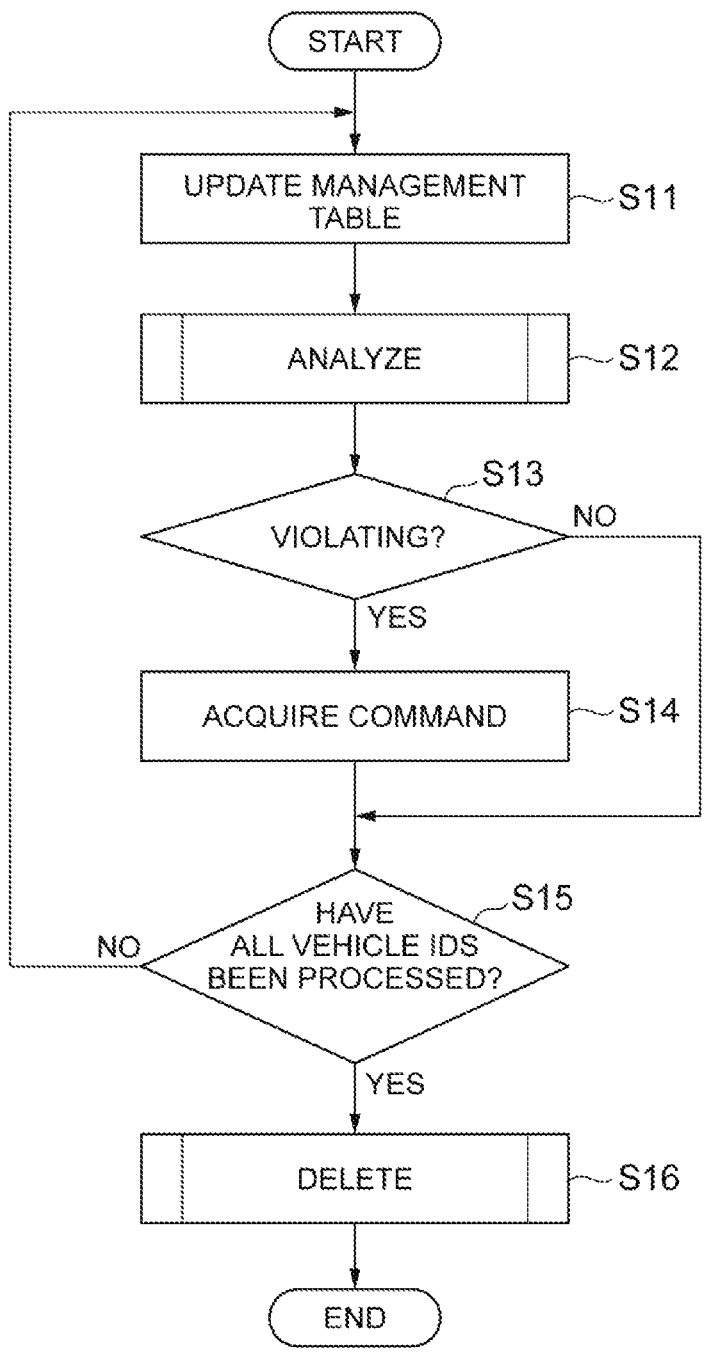
FIG. 7 is a flowchart illustrating in detail the vehicle behavior detection processing of FIG. 6.
Figure 8:
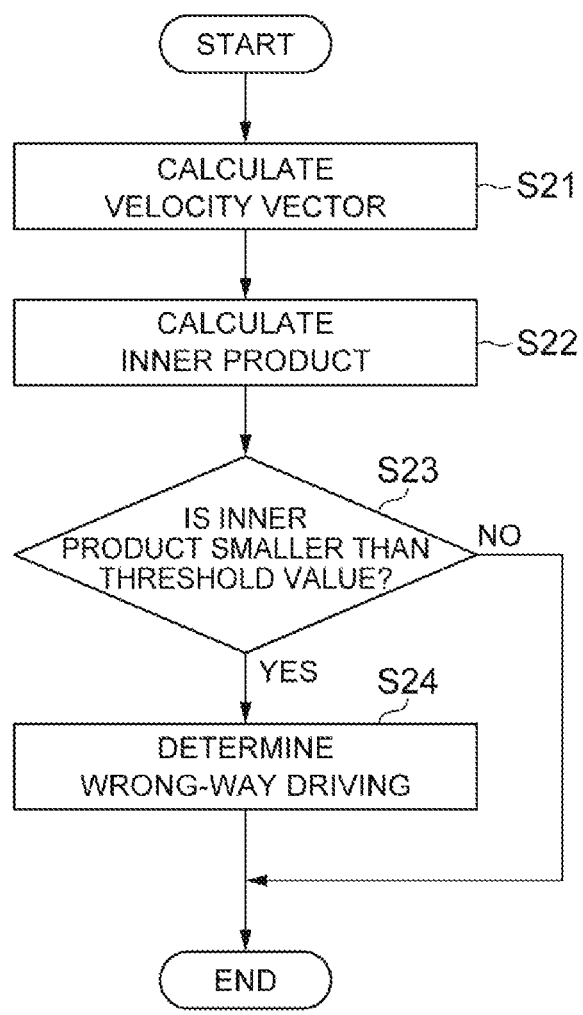
FIG. 8 is a flowchart illustrating in detail the analysis processing of FIG. 7.
Figure 9:
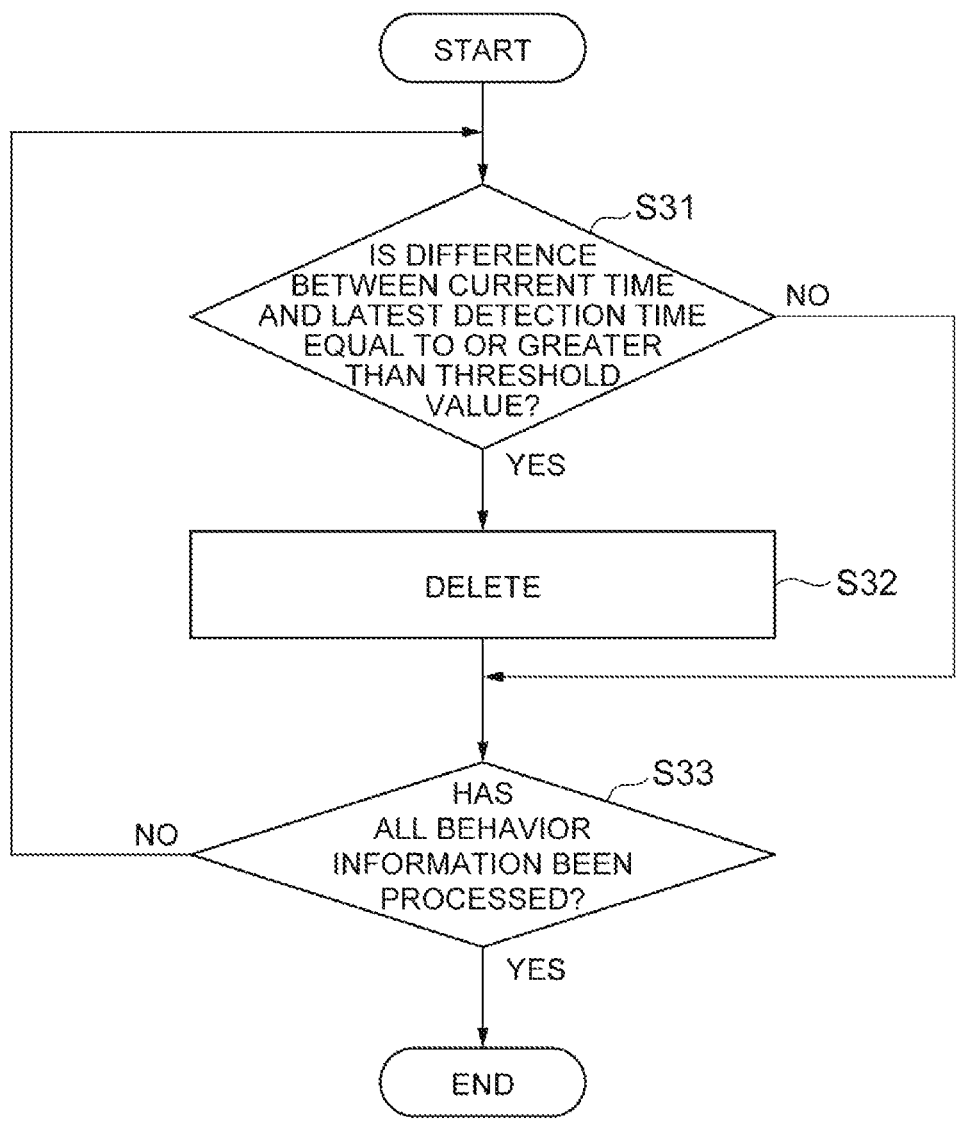
FIG. 9 is a flowchart illustrating in detail the deletion processing of FIG. 7.

Next, a detection method performed by the detection device 10 is described with reference to FIGS. 6 to 9. FIG. 6 is a flowchart illustrating a series of processing steps of a detection method performed by the detection device. FIG. 7 is a flowchart illustrating in detail the vehicle behavior detection processing of FIG. 6. FIG. 8 is a flowchart illustrating in detail the analysis processing of FIG. 7. FIG. 9 is a flowchart illustrating in detail the deletion processing of FIG. 7. The series of processing steps illustrated in FIG. 6 is performed, for example, at regular intervals.

First, the acquisition unit 11 acquires point cloud information from the laser radar 2 (step S01). Then, the acquisition unit 11 outputs the acquired point cloud information to the object detection unit 13. Then, the object detection unit 13 detects a detected object on the basis of the point cloud information (step S02). Specifically, when the object detection unit 13 receives the point cloud information from the acquisition unit 11, the object detection unit 13 excludes, from the point cloud information, the measurement point information of the measurement points located outside the detection area Rd indicated by the area information received from the setting unit 12. Then, the object detection unit 13 clusters the remaining point cloud information, and detects each of the acquired clusters as a single detected object (vehicle, person, or the like). Then, the object detection unit 13 calculates the dimensions and positions of the detected objects.

Then, the object detection unit 13 classifies the detected objects (step S03). Specifically, the object detection unit 13 classifies the detected objects into vehicles or non-vehicles on the basis of the dimensions of the detected objects. Then, the object detection unit 13 outputs the detection result of the detected objects classified as vehicles to the object tracking unit 14.

Subsequently, the object tracking unit 14 tracks the detected object (detected vehicle) (step S04). Specifically, when the object tracking unit 14 receives the detection result from the object detection unit 13, the object tracking unit 14 assigns the detected vehicle with a new vehicle ID as a new detected vehicle in a case where the object tracking unit 14 determines that the detected vehicle detected in the current frame does not correspond to any of the detected vehicles detected in the past frames. In a case where the object tracking unit 14 determines that the detected vehicle detected in the current frame corresponds to the detected vehicle detected in the past frame, the object tracking unit 14 assigns the detected vehicle detected in the current frame with the vehicle ID assigned to the corresponding detected vehicle. Then, the object tracking unit 14 outputs the tracking result (the vehicle ID, the vehicle position information, and the detection time information) to the behavior detection unit 15.

Subsequently, the behavior detection unit 15 carries out vehicle behavior detection processing (step S05). In the vehicle behavior detection processing of step S05, as illustrated in FIG. 7, when the behavior detection unit 15 receives the tracking result from the object tracking unit 14, the behavior detection unit 15 carries out the processing steps S11 to S14 for each vehicle ID included in the tracking result. First, the behavior detection unit 15 updates the management table (step S11). The management table is a table for managing the detected vehicles.

The management table manages behavior information by associating the vehicle IDs with history information. The history information is information indicating the history (trajectory of movement) of the position of the detected vehicle indicated by the vehicle ID. The history information includes one or more pairs of the detection time information indicating the detection time and the vehicle position information indicating the position of the detected vehicle indicated by the vehicle ID at the detection time.

When there is no behavior information including the vehicle ID included in the tracking result in the management table, the behavior detection unit 15 additionally registers the behavior information including the vehicle ID in the management table. In other words, the behavior detection unit 15 adds new behavior information, sets the vehicle ID included in the tracking result as the vehicle ID of the behavior information, and sets the pair of the detection time information and the vehicle position information included in the tracking result as the history information. When the behavior information including the vehicle ID included in the tracking result is present in the management table, the behavior detection unit 15 adds the pair of the detection time information and the vehicle position information included in the tracking result to the history information of the behavior information.

Then, the behavior detection unit 15 carries out the analysis processing (step S12). In the analysis processing of step S12, as illustrated in FIG. 8, the behavior detection unit 15 first calculates the velocity vector Vv(t) of the detected vehicle M (step S21). Specifically, the behavior detection unit 15 extracts the vehicle position information at the latest detection time (here, the detection time t) and the vehicle position information at the previous detection time (here, the detection time t−1) from the history information corresponding to the vehicle ID. As shown by Formula (1), the behavior detection unit 15 then subtracts the position p(t−1) of the detected vehicle M indicated by the vehicle position information at detection time t−1 from the position p(t) of the detected vehicle M indicated by the vehicle position information at detection time t to obtain the position vector, and divides the position vector by the time difference between the detection time t and the detection time t−1 to calculate the velocity vector Vv(t)=(vx, vy).

Subsequently, the behavior detection unit 15 calculates the inner product of the reference vector Vr and the velocity vector Vv(t), as shown in Formula (2) (step S22). The behavior detection unit 15 then compares the inner product with the threshold value to determine whether the inner product is smaller than the threshold value (step S23). When the behavior detection unit 15 determines that the inner product is smaller than the threshold value (step S23; YES), the behavior detection unit 15 determines that the detected vehicle M is traveling the wrong way (step S24) and ends the analysis processing of step S12. On the other hand, when the behavior detection unit 15 determines that the inner product is equal to or greater than the threshold value (step S23; NO), the behavior detection unit 15 determines that the detected vehicle M is not traveling the wrong way and ends the analysis processing of step S12.

Alternatively, the behavior detection unit 15 may determine, in step S23, whether the inner product continues to take a negative value smaller than the threshold value for at least a predetermined period (fixed time). When the inner product continues to take the negative value smaller than the threshold value over the fixed time, the behavior detection unit 15 may determine that the detected vehicle M is traveling the wrong way.

Subsequently, as illustrated in FIG. 7, when the behavior of the detected vehicle M is determined to be the wrong-way traveling (violating) in step S12 (step S13; YES), the behavior detection unit 15 transmits, to the vehicle information acquisition device 3, an acquisition command together with the vehicle position information to acquire the vehicle information of the detected vehicle (step S14). At this time, the behavior detection unit 15 may transmit various kinds of information regarding the violating vehicle to the storage device 5 and the communication device 6. The various kinds of information may include the detection time, position, speed, and size (dimensions) of the detected vehicle (violating vehicle). The various kinds of information may include a video image in a time period including the detection time. The various kinds of information may include the point cloud information in the time period including the detection time, and a trajectory of movement of the detected vehicle (vehicle position information in time series). The behavior detection unit 15 may also transmit an output command to the output device 4 to give caution, warning, and instruction to the violating vehicle. The behavior detection unit 15 does not transmit the acquisition command to the vehicle information acquisition device 3 when the behavior of the detected vehicle M is not determined to be the wrong-way traveling in step S12 (step S13; NO).

Then, the behavior detection unit 15 determines whether all vehicle IDs included in the tracking result have been processed (step S15). When the behavior detection unit 15 determines that not all vehicle IDs have been processed (step S15; NO), the behavior detection unit 15 carries out steps S11 to S15 again for the next vehicle ID. On the other hand, when the behavior detection unit 15 determines that all vehicle IDs have been processed (step S15; YES), the behavior detection unit 15 carries out the behavior information deletion processing (step S16).

In the deletion processing of step S16, as illustrated in FIG. 9, the behavior detection unit 15 performs the processing of step S31 and step S32 for each piece of behavior information registered in the management table. First, the behavior detection unit 15 calculates the difference between the current time and the detection time indicated by the latest detection time information included in the history of the behavior information, and determines whether the difference is equal to or greater than a predetermined threshold value (step S31). The threshold value is set to, for example, a value greater than the average time required for the vehicle to pass through the detection area Rd. When the behavior detection unit 15 determines that the difference is equal to or greater than the threshold value (step S31; YES), the behavior detection unit 15 deletes the behavior information from the management table (step S32), assuming that the vehicle indicated by the vehicle ID of the behavior information in question has exited the detection area Rd. On the other hand, when the behavior detection unit 15 determines that the difference is less than the threshold value (step S31; NO), the behavior detection unit 15 does not delete the behavior information from the management table.

Then, the behavior detection unit 15 determines whether all the behavior information registered in the management table has been processed (step S33). When it is determined that not all the behavior information has been processed (step S33; NO), the behavior detection unit 15 carries out steps S31 to S33 again for the next behavior information. On the other hand, when the behavior detection unit 15 determines that all the behavior information has been processed (step S33; YES), the behavior detection unit 15 ends the vehicle behavior detection processing. Thus, a series of processing steps of the detection method performed by the detection device 10 is completed.

When the vehicle information acquisition device 3 receives the acquisition command along with vehicle position information from the detection device 10 (behavior detection unit 15), the vehicle information acquisition device 3 acquires the vehicle information. Specifically, when the vehicle present at the position indicated by the vehicle position information enters the monitoring range Rb, the vehicle information acquisition device 3 acquires an image of the license plate by photographing the vehicle so as to include the license plate of the vehicle in question. The vehicle information acquisition device 3 then transmits the vehicle information to the storage device 5 and causes the vehicle information to be stored in the storage device 5, while transmitting the vehicle information to public organizations, road management companies, or the like via the communication device 6.

As described above, the detection system 1 and the detection device 10 detect the detected vehicle M using the point cloud information generated by the laser radar 2. The laser radar 2 is not susceptible to environmental disturbances such as changes in light intensity depending on the time period (morning and night), changes in weather (rainy weather, snowfall, and dense fog), and strong light from sunlight, headlights, and the like. Further, the laser radar 2 can measure the distance between the laser radar 2 and an object with an error of about a few centimeters. Therefore, the detection system 1 and the detection device 10 can detect the position of the detected vehicle M with high accuracy.

There is a case where the movement in a direction different from the actual movement of the vehicle is detected due to a measurement error by the laser radar 2. In other words, the position of the detected vehicle M may not be accurately obtained, so that, for example, if the target behavior is detected only on the basis of the direction of movement of the detected vehicle M, the detected vehicle M may be determined as traveling the wrong way even though the vehicle has stopped. Thus, the false detection may occur if the target behavior is detected only by the direction of movement of the detected vehicle M. In contrast, the detection system 1 and the detection device 10 detect the target behavior on the basis of the direction of movement and the amount of movement per unit time of the detected vehicle M. Specifically, the detection system 1 and the detection device 10 use the velocity vector Vv(t) to determine whether the detected vehicle M has performed the target behavior. The velocity vector Vv(t) indicates the direction of movement of the detected vehicle M and the amount of movement of the detected vehicle M per unit time. Therefore, since the amount of movement of the detected vehicle M per unit time as well as the direction of movement of the detected vehicle M are considered, it can be determined that the detected vehicle M has not performed the target behavior when the amount of movement of the detected vehicle M per unit time is small. This can reduce the possibility of false detection of the target behavior due to the measurement error. As a result, it is possible to improve the accuracy of detection of the vehicle behavior.

Further, the detection system 1 and the detection device 10 calculate the velocity vector Vv(t) on the basis of the position p(t) of the detected vehicle M at the detection time t and the position p(t−1) of the detected vehicle M at the detection time t−1, and determine whether the detected vehicle M has performed the target behavior on the basis of the velocity vector Vv(t). Between the detection time t−1 and the detection time t, the detected vehicle M is moving from the position p(t−1) to the position p(t). Therefore, the position vector indicating the direction of movement of the detected vehicle M can be calculated using the vehicle position information at the detection time t−1 and t. Further, the velocity vector Vv(t) can be calculated by dividing the position vector by the time difference between the detection time t−1 and the detection time t.

The detection system 1 and the detection device 10 calculate the inner product of the reference vector Vr and the velocity vector Vv(t), and determine whether the detected vehicle M has performed the target behavior by comparing the inner product with the threshold value. The inner product obtained as described above can represent the direction of movement of the detected vehicle M and the amount of movement of the detected vehicle M per unit time. For example, if the inner product is positive, the direction of movement of the detected vehicle M is the same as the permitted direction of traffic on the road TR (lane), and if the inner product is negative, the direction of movement of the detected vehicle M is opposite to the direction of traffic permitted for the road TR (lane). The magnitude of the inner product represents the amount of movement of the detected vehicle M per unit time. Therefore, the use of the inner product allows reduction of the amount of calculation required to detect the target behavior.

The behavior detection unit 15 outputs the acquisition command to cause the vehicle information acquisition device 3 to acquire the vehicle information for identifying the vehicle that performed the target behavior when the target behavior is the traffic violation. Thus, the vehicle information for identifying the violating vehicle is acquired. For example, it is possible to impose penalty points on and collect fines from the driver of the violating vehicle. By identifying the violating vehicle, it is also possible to give warning to the driver of the violating vehicle. In a case of driving with a high danger level such as the wrong-way traveling, driving instructions can be given. For example, the driving instructions such as "The vehicle is traveling the wrong way. Make a U-turn immediately" can be given.

Since the laser radar 2 repeatedly irradiates the irradiation possible range Ra (detection area Rd) with laser light, the position of the detected vehicle M can be detected with time. Since the laser radar 2 has a wider detection area Rd than a camera or the like, it is not necessary to install a plurality of laser radars 2. The laser radar 2 can also measure in a space with good visibility such as inside the intersection.

Although the embodiment of the present disclosure has been described above, the present invention is not limited to the above embodiment.

For example, in the above embodiment, the detection device 10 is configured as one device, but may be configured by two or more devices. The detection device 10 may include the laser radar 2. The laser radar 2 may include an information processing device having the function of the detection device 10.

The target point may be an intersection. The intersection may be an intersection where two roads intersect or a T-junction. The target point may be a confluence point where two or more roads meet, or a confluence point between an exit of a building or other facility and a road. The target point may be set on a public road or on a highway.

Instead of the velocity vector Vv(t), the behavior detection unit 15 may determine whether the detected vehicle M has performed the target behavior on the basis of the position vector. For the calculation of the velocity vector Vv(t) (or position vector), the positions of the detected vehicle M in two consecutive frames need not be used, but only the positions of the detected vehicle M at two detection times need to be used.

Figure 10:
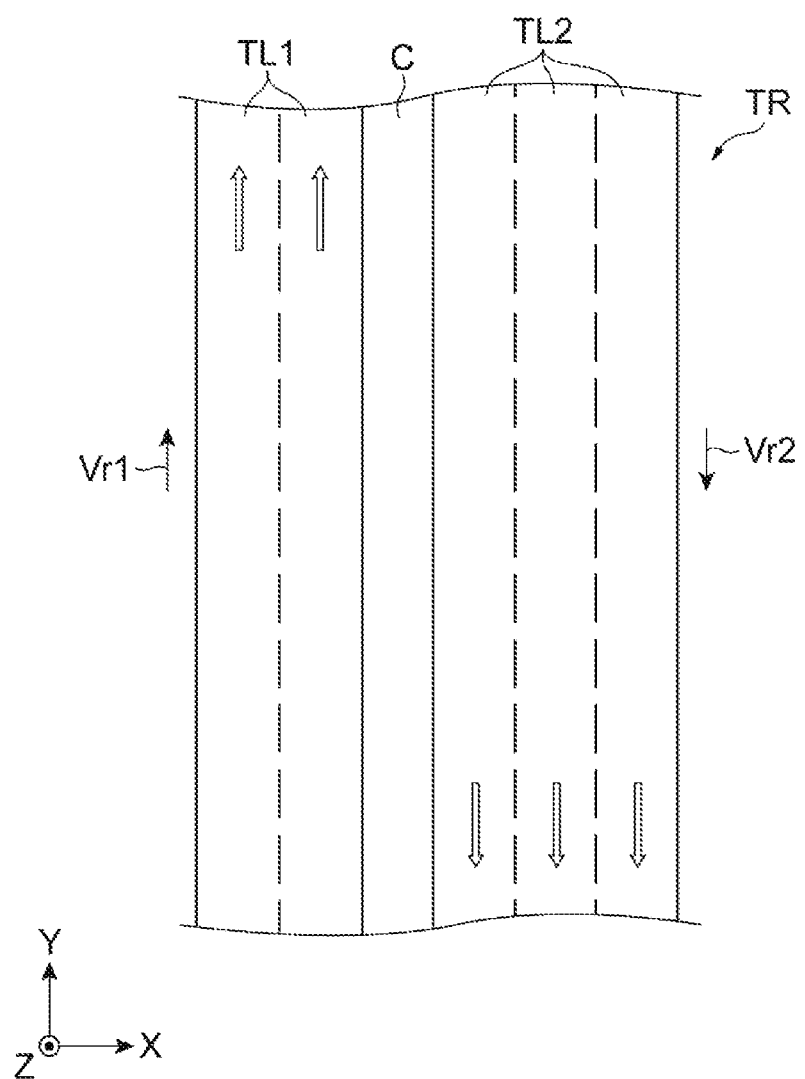
FIG. 10 is a diagram for explaining a modification of detection of the wrong-way traveling.

The road subjected to detection of the wrong-way traveling may not be a road including one lane (driving lane), and may be a road including a plurality of lanes. A common reference vector is set for lanes having the same permitted direction of traffic. In the example illustrated in FIG. 10, the road TR includes two lanes TL1, three lanes TL2, and a median strip C. On this road TR, the median strip C divides it into two lanes TL1 and three lanes TL2. The same direction (Y-axis positive direction) of traffic is permitted in the two lanes TL1, and the same direction (Y-axis negative direction) of traffic is permitted in the three lanes TL2. In this case, the reference vector Vr1=(0, 1) is set for the two lanes TL1. Similarly, the reference vector Vr2=(0, −1) is set for the three lanes TL2. With this configuration, it is possible to detect the wrong-way traveling without increasing the number of laser radars 2 in the lanes having different permitted direction of traffic. The reference vector may be set for each lane.

The behavior detection unit 15 may determine whether the detected vehicle M has performed the target behavior on the basis of the transition of the velocity vector. In this case, the behavior information further includes the velocity vector calculated at each detection time in the history information. The behavior detection unit 15 detects the target behavior on the basis of changes in the direction of a plurality of velocity vectors in the behavior information when the plurality of velocity vectors in the behavior information are arranged in time series. For example, when the target behavior is the wrong-way traveling, the behavior detection unit 15 determines that the detected vehicle M is traveling the wrong way in a case where the direction of the velocity vector is opposite to the direction of traffic permitted for the road (lane) in two or more consecutive frames. Alternatively, when the inner product is used, the behavior detection unit 15 may determine, as described above, that the detected vehicle M is traveling the wrong way in a case where the inner product continues to take a negative value smaller than the threshold value at least for the predetermined period of time (fixed time).

Figure 11:
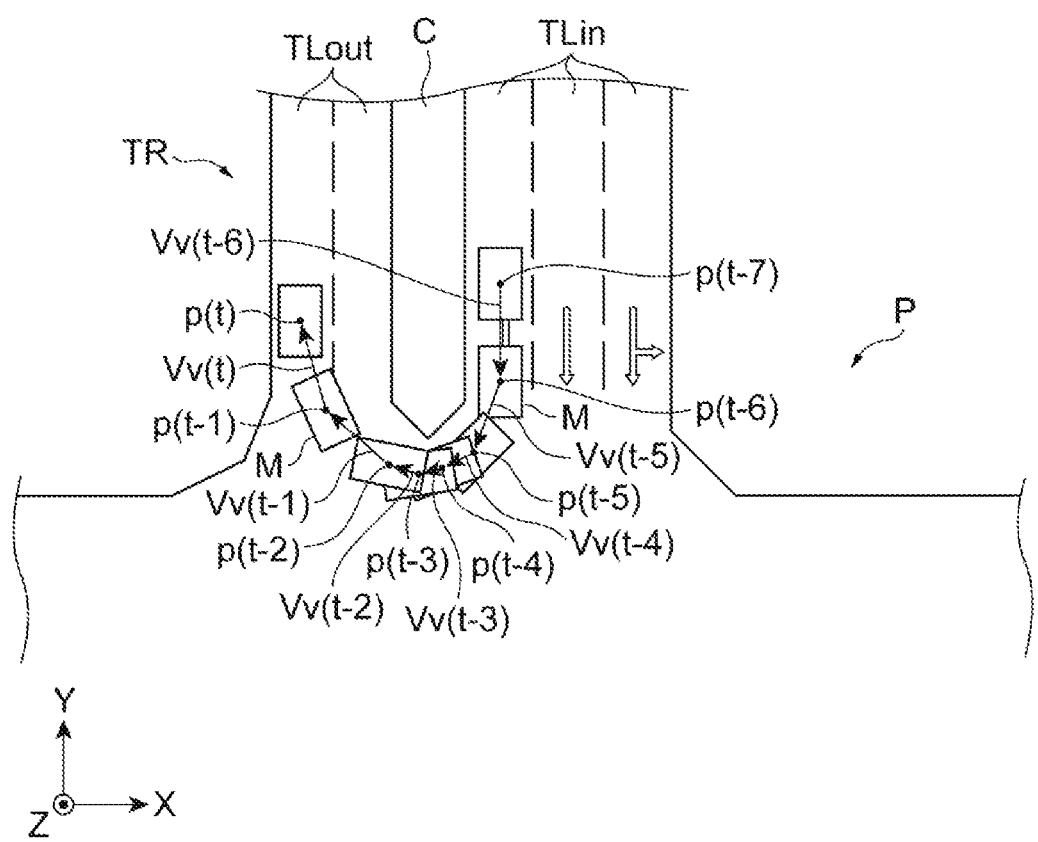
FIG. 11 is a diagram for explaining detection of a U-turn.

The target behavior is not limited to the wrong-way traveling. For example, as illustrated in FIG. 11, the target behavior may be the U-turn at an intersection P where U-turns are prohibited. The U-turn, which is also called turning, means that the vehicle travels in the opposite direction by changing the direction of travel by 180 degrees. In the example illustrated in FIG. 11, one road TR extending along the Y-axis positive direction from the intersection P includes a plurality of (here, three) lanes TLin entering the intersection P, a plurality of (here, two) lanes TLout exiting the intersection P, and a median strip C provided between the lanes TLin and the lanes TLout. The lanes TLout are arranged in the X-axis negative direction with respect to the lanes TLin. The direction of traffic permitted for the lane TLin is the Y-axis negative direction, and the direction of traffic permitted for the lane TLout is the Y-axis positive direction.

In this case, the velocity vectors $Vv(t-6)$ to $Vv(t)$ are calculated from two positions adjacent to each other in time series among the positions $p(t-7)$ to $p(t)$ at the detection time $t-7$ to $t$, respectively, of the detected vehicle M. Then, the behavior detection unit 15 detects the U-turn, for example, on the basis of changes in the direction of the velocity vectors $Vv(t-6)$ to $Vv(t)$ when the velocity vectors $Vv(t-6)$ to $Vv(t)$ are arranged in time series (from the oldest velocity vector). For example, when the direction of the velocity vectors $Vv(t-6)$ to $Vv(t)$ arranged in time series changes in the order of the Y-axis negative direction, X-axis negative direction, and Y-axis positive direction, the behavior detection unit 15 determines that the detected vehicle M has made the U-turn from the lane TLin to the lane TLout.

Figure 12:
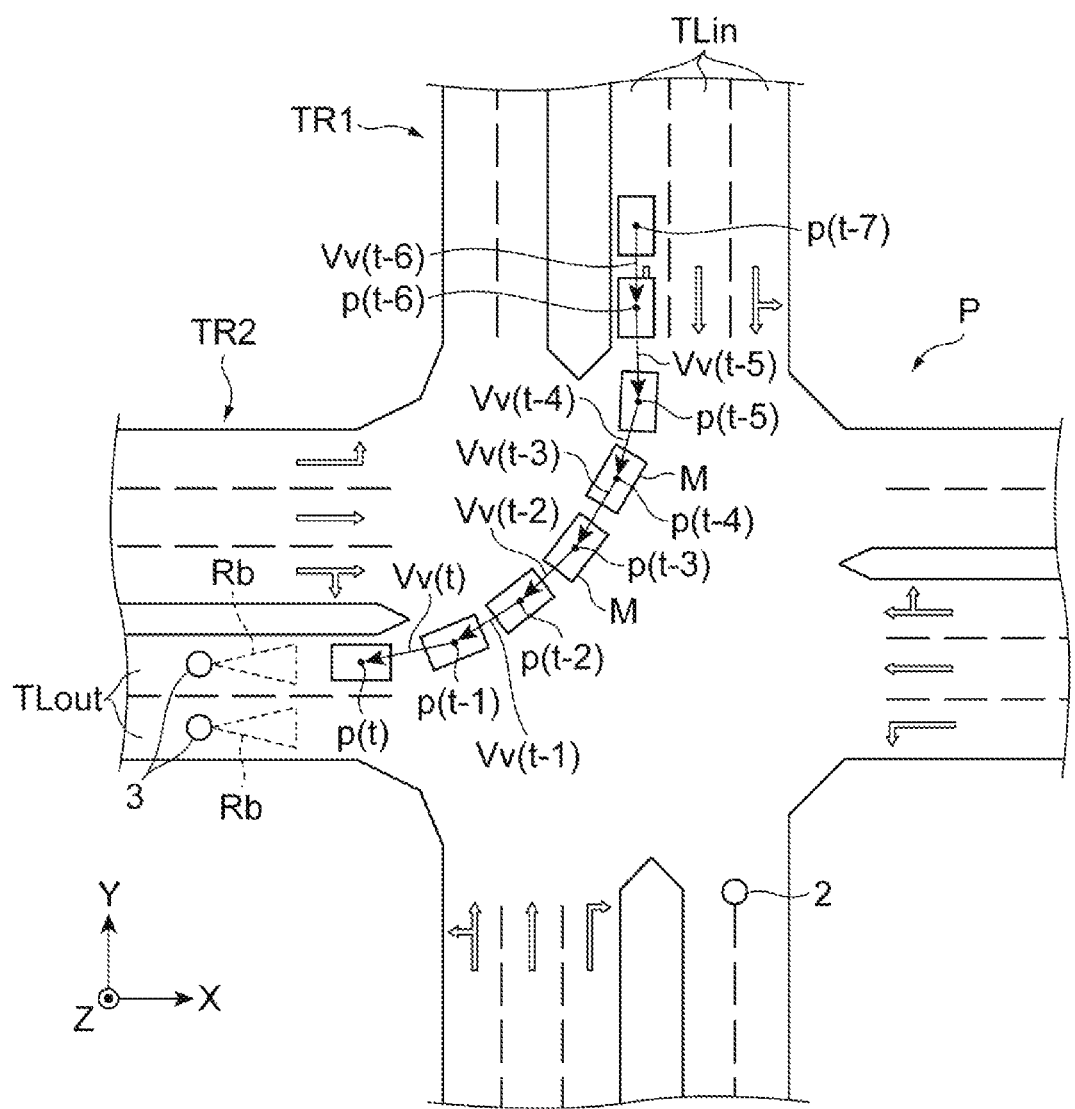
FIG. 12 is a diagram for explaining detection of a right turn.

As illustrated in FIG. 12, the target behavior may be the right turn at the intersection P where right turns are prohibited. In the example illustrated in FIG. 12, the road TR1 extending from the intersection P along the Y-axis positive direction includes a plurality of (here, three) lanes TLin that enter the intersection P. The road TR2 extending from the intersection P along the X-axis negative direction includes a plurality of (here, two) lanes TLout exiting from the intersection P. Similar to the case of the U-turn, the velocity vectors $Vv(t-6)$ to $Vv(t)$ are calculated from two positions adjacent to each other in time series among the positions $p(t-7)$ to $p(t)$ at the detection time $t-7$ to $t$, respectively, of the detected vehicle M. The behavior detection unit 15 determines that the detected vehicle M has made the right turn from the lane TLin of the road TR1 to the lane TLout of the road TR2 when the direction of $Vv(t-6)$ to $Vv(t)$ arranged in time series (from the oldest velocity vector) changes in the order of the Y-axis negative direction and the X-axis negative direction.

Figure 13:
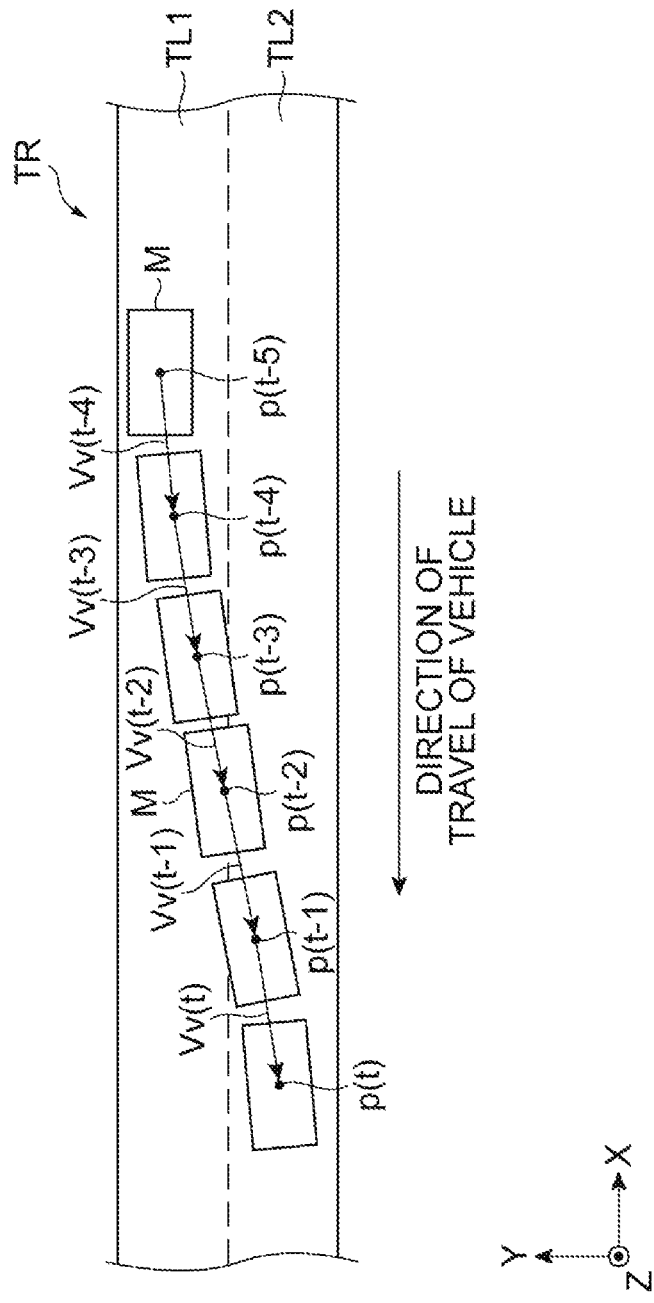
FIG. 13 is a diagram for explaining detection of a lane change.

As illustrated in FIG. 13, the target behavior may be a lane change in an area (section) where the lane change is prohibited. The lane change means the movement of the vehicle from one lane to another. In this case, one road includes a plurality of lanes, the same direction of traffic is permitted for the plurality of lanes, and a line indicating prohibition of the lane change (a yellow line in Japan) is drawn between two adjacent lanes. In the example illustrated in FIG. 13, the road TR includes two lanes TL1 and TL2 having the same direction of traffic. The direction of traffic on the lanes TL1 and TL2 is the X-axis negative direction. In this case, the velocity vectors $Vv(t-4)$ to $Vv(t)$ are calculated from two positions adjacent to each other in time series among the positions $p(t-5)$ to $p(t)$ at the detection time $t-5$ to $t$, respectively, of the detected vehicle M. The behavior detection unit 15 determines that the detected vehicle M has changed the lane from the lane TL1 to the lane TL2 when the direction of $Vv(t-4)$ to $Vv(t)$ arranged in time series (from the oldest velocity vector) changes in the order of the X-axis negative direction, the direction having components of the X-axis negative direction and the Y-axis negative direction, and the X-axis negative direction.

The road subjected to lane change detection is not limited to a road having two lanes, and may be a road having three or more lanes. Similar to the lane change between two lanes, a lane change in multiple lanes can be detected.

As described above, when the detected vehicle M performs the target behavior, the direction of movement of the detected vehicle M changes over time in the predetermined pattern corresponding to the target behavior. Therefore, when the velocity vector changes in the predetermined pattern, the detected vehicle M can be determined as having performed the target behavior.

The target behavior is not limited to the traffic violation behavior (traveling). For example, the target behavior may be a U-turn in an area where U-turns are not prohibited, a right (or left) turn in an area where right (or left) turns are not prohibited, a lane change in an area where lane changes are not prohibited, normal traveling, a change of course, or the like. The change of course means to travel obliquely with respect to the direction in which the road extends. The change of course includes the lane change. Similar to the lane change, the change of course can be detected.

The normal traveling means traveling in the permitted direction of traffic of the vehicle on the road (lane). Similar to the detection of the wrong-way traveling, normal traveling can be detected. When the inner product of the velocity vector $Vv(t)$ and the reference vector $Vr$ is used, the threshold value for determining the normal traveling is different from the threshold value for determining the wrong-way traveling. In other words, the threshold value for determining the normal traveling is a predetermined positive value and has a magnitude large enough to exclude the measurement error by the laser radar 2. The behavior detection unit 15 then determines whether the detected vehicle M is traveling normally by comparing the inner product with the threshold value for determining the normal traveling. For example, the behavior detection unit 15 determines that the detected vehicle M is traveling normally when the inner product is greater than the threshold value for determining the normal traveling, while determining that the detected vehicle M is not traveling normally when the inner product is determined to be equal to or smaller than the threshold value for determining the normal traveling. The behavior detection unit 15 may determine that the detected vehicle M is traveling normally when the inner product continues to take a positive value greater than the threshold value for determining the normal traveling for at least a predetermined period of time (fixed time).

When the target behavior is not the traffic violation behavior, the detection system 1 acquires statistical information such as the number of vehicles that have performed the target behavior. In this case, the detection system 1 may not include the vehicle information acquisition device 3.

The arrangement of the laser radar 2 and the vehicle information acquisition device 3 is not limited to the arrangement illustrated in each drawing. For example, in FIG. 5, the vehicle information acquisition device 3 is capable of photographing the wrong-way traveling vehicle from the front side and the rear side. The vehicle information acquisition device 3 may be provided so as to be able to photograph the wrong-way traveling vehicle only from the rear side or only from the front side.

As the laser radar 2, a three-dimensional laser radar of the type that can irradiate laser light in all surrounding directions may be used. For example, when the target behavior is the U-turn at the intersection, it is possible to detect the U-turn on four roads of the intersection. When the target behavior is the right turn, it is possible to detect the right turn from a plurality of roads extending from the intersection. The detection system 1 and the detection device 10 may detect multiple kinds of target behaviors with the single laser radar 2. In these cases, the number of the laser radars 2 can be reduced because the behaviors of a plurality of vehicles can be detected by the single laser radar 2.

The detection system 1 includes the single laser radar 2, but the detection system 1 may include a plurality of laser radars 2. In this case, the detection device 10 may use combined point cloud information generated by the plurality of laser radars 2. Since this configuration can reduce blind spots, it is possible to improve the reliability of detection.

The vehicle information acquisition device 3 is not limited to the automatic speed violation enforcement device and may be a video camera having a high resolution. The vehicle information acquisition device 3 may further include a light source (also called a flash device or a strobe device) for photographing at night. The vehicle information acquisition device 3 may acquire, for example, the vehicle information (e.g., information written on the license plate) by wireless communication between the communication device 6 and an on-vehicle device.

The vehicle information acquired by the vehicle information acquisition device 3 is not limited to the image of the license plate. The vehicle information may be a facial photograph of the driver of the vehicle. The vehicle information may be electronic information such as the information of the driver license.

When a gate (crossing bar) is installed ahead of the violating vehicle, the detection device 10 may control the gate to be blocked to physically obstruct traveling of the violating vehicle. For example, an electronic toll collection system (ETC) gate is provided on the highway, and the behavior detection unit 15 may control so as to close the ETC gate. This can prevent traveling of the violating vehicle and the violation traveling.

If the detection system 1 and the detection device 10 can intervene in a driving control system of the violating vehicle, the detection system 1 and the detection device 10 may safely stop the violating vehicle.

When the target behavior is the U-turn, the behavior detection unit 15 may calculate the minimum distance between the center of the intersection and the trajectory of the detected vehicle M during the U-turn, as well as the start position of the U-turn. The behavior detection unit 15 may include such information in the various kinds of information regarding the detected vehicle M and transmit the various kinds of information to the storage device 5 and the communication device 6. The U-turn start position is the position of the detected vehicle M when the detected vehicle M enters the intersection. It is very dangerous if the vehicle makes the U-turn after entering the intersection and deeply approaching near the center of the intersection, or initiates the U-turn from a position away from the median strip. By adding the above information, it is possible to give, for example, a high penalty to the driver who has made such a highly dangerous U-turn.

The detection device 10 may further include a determination unit that determines whether an emergency vehicle is approaching the target point on the basis of the siren sound of the emergency vehicle or the coordinate information (global positioning system (GPS) information) of the emergency vehicle. For example, the lane change is permitted for yielding the course to the emergency vehicle even in the lane change prohibited area. Therefore, the behavior detection unit 15 may add the information indicating that the emergency vehicle has passed the target point to the various kinds of information regarding the detected vehicle M, and transmit the various kinds of information to the storage device 5 and the communication device 6. The behavior detection unit 15 may not transmit various kinds of information regarding the detected vehicle M while the emergency vehicle is passing through the target point to the storage device 5 and the communication device 6.

Turning right or left or changing lanes without giving an indication of the direction of travel by a directional indicator is a traffic violation (failure to signal violation). In order to detect this traffic violation, the detection system 1 may further include an imaging device such as a video camera. The imaging device transmits the captured image to the detection device 10. The behavior detection unit 15 analyzes the captured image to determine whether the detected vehicle M indicates the direction of travel. Then, the behavior detection unit 15 may determine that the detected vehicle M is the violating vehicle when the behavior detection unit 15 determines that the detected vehicle M having made the right or left turn or the lane change did not give the indication of the direction of travel.

REFERENCE SIGNS LIST

1 Detection system
2 Laser radar
3 Vehicle information acquisition device (External device)
4 Output device
5 Storage device
6 Communication device
10 Detection device
11 Acquisition unit
12 Setting unit
13 Object detection unit (Vehicle detection unit)
14 Object tracking unit 15 Behavior detection unit
M Detected vehicle
Rd Detection area

The invention claimed is:

1. A detection device for detecting a target behavior that is a vehicle behavior subjected to detection in a preset detection area using a laser radar that generates point cloud information by irradiating the detection area with laser light and receiving reflected light resulting from the irradiation with the laser light, the detection device comprising:
   an acquisition unit configured to acquire the point cloud information;
   a vehicle detection unit configured to detect a vehicle based on the point cloud information; and
   a behavior detection unit configured to detect the target behavior based on a direction of movement and an amount of movement per unit time of the vehicle detected by the vehicle detection unit, wherein
   the vehicle detection unit calculates position information indicating a position of the vehicle based on the point cloud information,
   the behavior detection unit calculates a position vector indicating a distance and a direction from a second position indicated by second position information which is the position information at a time 2 before a time 1 to a first position indicated by first position information which is the position information at the time 1, and divides the position vector by a time difference between the time 1 and the time 2 to calculate a velocity vector, and
   the behavior detection unit calculates an inner product of the velocity vector and a reference vector having an orientation along a direction of traffic of the vehicle permitted in the detection area, and compares the inner product with a predetermined threshold value to determine whether the vehicle has performed the target behavior.

2. The detection device according to claim 1, wherein the behavior detection unit determines whether the vehicle has performed the target behavior based on a transition of the velocity vector.

3. The detection device according to claim 1, wherein when the target behavior is a traffic violation behavior, the behavior detection unit outputs an acquisition command to cause an external device to acquire vehicle information that identifies the vehicle that has performed the target behavior.

4. A detection system, comprising:
   a detection device according to claim 1; and
   a laser radar.

5. A detection device for detecting a target behavior that is a vehicle behavior subjected to detection in a preset detection area using a laser radar that generates point cloud information by irradiating the detection area with laser light and receiving reflected light resulting from the irradiation with the laser light, the detection device comprising processing circuitry configured to:
   acquire the point cloud information;
   detect a vehicle based on the point cloud information; and
   detect the target behavior based on a direction of movement and an amount of movement per unit time of the vehicle detected by the processing circuitry,
   wherein the processing circuitry calculates position information indicating a position of the vehicle based on the point cloud information;
   wherein the processing circuitry calculates a position vector indicating a distance and a direction from a second position indicated by second position information which is the position information at a time 2 before a time 1 to a first position indicated by first position information which is the position information at the time 1, and divides the position vector by a time difference between the time 1 and the time 2 to calculate a velocity vector; and
   wherein the processing circuitry calculates an inner product of the velocity vector and a reference vector having an orientation along a direction of traffic of the vehicle permitted in the detection area, and compares the inner product with a predetermined threshold value to determine whether the vehicle has performed the target behavior.

6. The detection device according to claim 5, wherein the processing circuitry determines whether the vehicle has performed the target behavior based on a transition of the velocity vector.

7. The detection device according to claim 5, wherein when the target behavior is a traffic violation behavior, the processing circuitry outputs an acquisition command to cause an external device to acquire vehicle information that identifies the vehicle that has performed the target behavior.

8. A detection system, comprising:
   a detection device according to claim 5; and
   a laser radar.

* * * * *